United States Patent
Guzikowski et al.

(10) Patent No.: US 6,267,917 B1
(45) Date of Patent: Jul. 31, 2001

(54) ROTATABLE MOLD APPARATUS HAVING REPLACEABLE MOLDS AND REPLACEMENT METHODS

(75) Inventors: Gary R. Guzikowski, Franklin, WI (US); Thomas E. Acklin, Mantua, OH (US); Thomas V. Searing, Greenfield, WI (US); Scott D. Ledermann, Waukesha, WI (US); Paul M. Ohnstad, Cedarburg, WI (US)

(73) Assignee: Norstar Aluminum Molds, Inc., Cedarburg, WI (US)

( * ) Notice: Subject to any disclaimer, the term of this patent is extended or adjusted under 35 U.S.C. 154(b) by 0 days.

(21) Appl. No.: 09/174,287

(22) Filed: Oct. 16, 1998

(51) Int. Cl.⁷ .................................................. B29C 41/04
(52) U.S. Cl. ................ 264/297.6; 264/310; 425/186; 425/188; 425/434; 425/435; 29/426.1; 29/428
(58) Field of Search ........................... 425/182, 195, 425/434, 435, 186, 188; 249/102; 264/297.6, 297.8, 310, 311; 29/426.1, 428

(56) References Cited

U.S. PATENT DOCUMENTS

| | | | |
|---|---|---|---|
| 3,546,747 | 12/1970 | Stefaniak et al. | 425/186 |
| 3,611,506 | * 10/1971 | Schroeder | 425/450.1 |
| 3,850,368 | * 11/1974 | Boeckeler | 233/35 |
| 4,472,127 | 9/1984 | Cyriax et al. | 425/183 |
| 4,473,346 | 9/1984 | Hehl | 425/183 |
| 4,832,590 | 5/1989 | Bellmer | 425/185 |
| 4,929,166 | 5/1990 | DiSimone et al. | 425/190 |
| 5,277,861 | 1/1994 | Zilbert | 264/255 |
| 5,306,564 | 4/1994 | Guzikowski | 425/408 |
| 5,562,935 | * 10/1996 | Martin | 425/552 |
| 5,843,488 | * 12/1998 | Korsch et al. | 425/193 |

* cited by examiner

*Primary Examiner*—Nam Nguyen
*Assistant Examiner*—Donald Heckenberg
(74) *Attorney, Agent, or Firm*—Quarles & Brady

(57) ABSTRACT

The present invention includes a mold apparatus for facilitating replacement of rotatable molds therein. First and second frames are provided forming a plurality of mold cells and each mold includes an upper and a lower mold section. The upper mold section is removably coupled to the upper frame, while the lower mold section is removably coupled to the lower frame. Using this arrangement, a mold may be removed by detaching all connections between it and the frames, while maintaining the frames closed. Similarly, a mold may be inserted into a mold cell and connected to the frames while maintaining the frames closed. The removal and insertion operations may be performed radially or axially, depending on frame configuration.

14 Claims, 6 Drawing Sheets

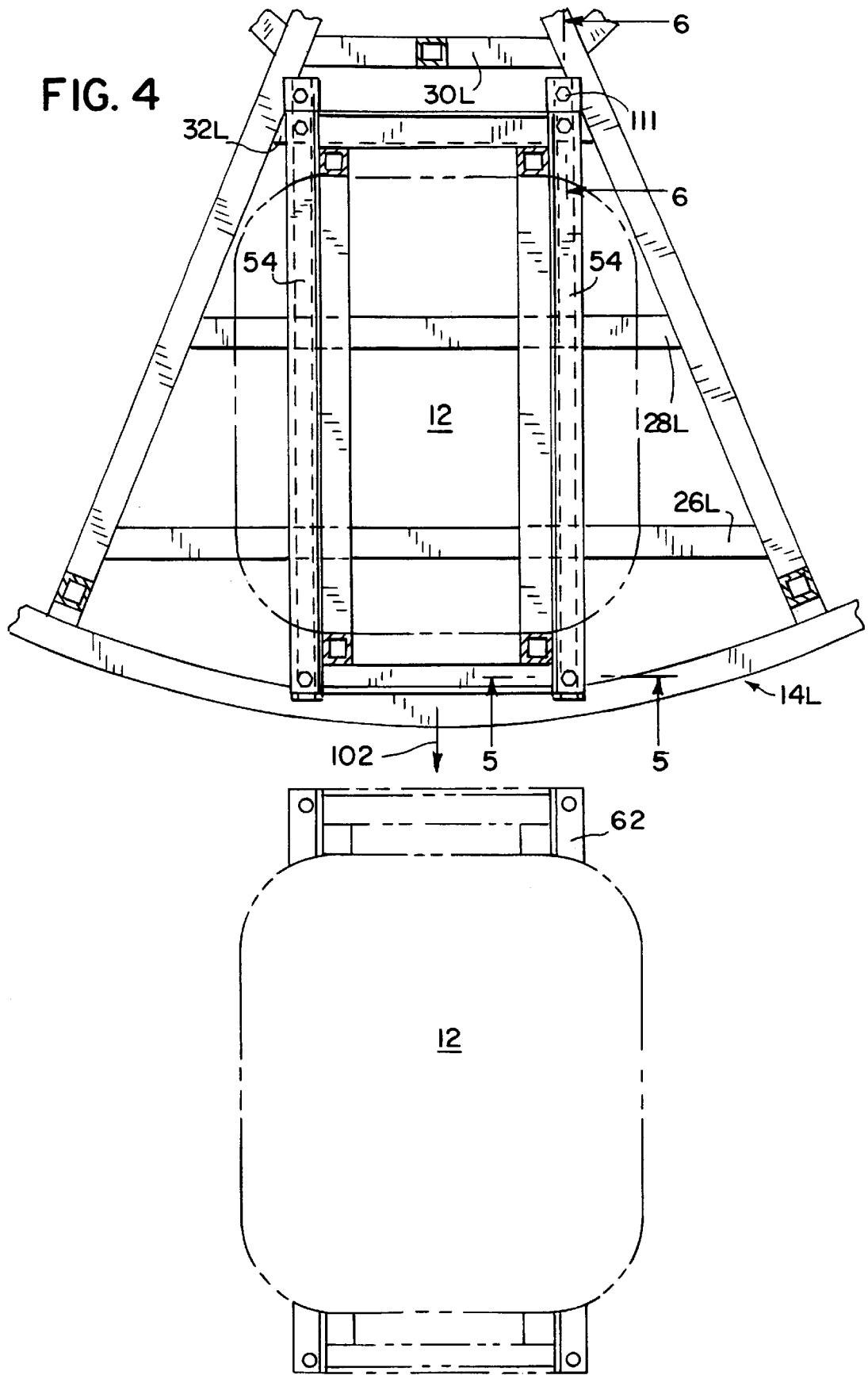

ROTATABLE MOLD APPARATUS HAVING REPLACEABLE MOLDS AND REPLACEMENT METHODS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to mold apparatus and more particularly to apparatus for facilitating removal and replacement of a single mold in a multi-mold rotational mold configuration which, in addition, facilitates opening of all molds simultaneously.

A molding cycle includes the steps of bringing together two or more mold parts to form a mold having a cavity in which an article may be cast, placing particulate material inside the mold, heating the mold until the material inside is melted, rotating the mold about several different axes so that the entire cavity surface is coated with the melted material and then allowing the mold to cool so that the melted material hardens and forms an article. Rotation about several axis is accomplished by securing the mold to a multi-articular machine which can facilitate the required movement.

Each step in a molding cycle requires a finite amount of time, the total cycle time referred to hereinafter as a cycle period. Process efficiency is generally measured by the number of articles which can be formed in a given period which is directly related to the duration of the cycle period.

To increase process efficiency, the industry has designed mold apparatus which can form several articles during a single cycle period. The most common multi-mold apparatus include several (e.g. 10) molds which are mounted to a "spider" wheel system which includes matching rigid spider wheels. Where each article mold consists of first and second mold halves, each first mold half is secured to a first spider wheel and each second mold half is secured to a second spider wheel. The spider wheels are constructed such that when the wheels are secured together, each second mold half is aligned with a corresponding first mold half forming a mold cavity and the molds are arrayed radially about a rotation axis.

With particulate material in each first mold half, the spider wheels are secured together forming separate yet mechanically linked molds. The spider wheel system is then secured to a multi-articulate machine and the heating, rotating and cooling steps described above are performed. To remove articles from the molds after cooling, the second spider wheel is moved axially away from the first spider wheel simultaneously opening all mold halves. U.S. pat. No. 5,306,564 describes a typical spider wheel system.

Typically spider wheels include rigid legs spaced around their perimeters which cooperate to separate adjacent wheels and form a space therebetween where molds are mounted. While the spacer legs are necessary, the legs limit the types of molds which can be used with a particular spider to a single mold family. In other words, spider wheels are custom built to accommodate specific types of molds.

Sometimes it is desirable to replace either all or a subset of molds which are linked to a multi-articulate machine so that articles having different characteristics can be formed. To replace all molds in a first set with molds in a second set which have different characteristics, one solution has been spider wheel refabrication. Unfortunately, refabrication is extremely time consuming and labor intensive and is therefore relatively costly and thus avoided.

Another solution for replacing mold sets has been to detach a first set of spider wheels and replace the wheels with a second set of wheels specifically designed to accommodate the second set of molds. While replacement requires less time and less labor than refabrication, the extreme complexity of wheel-machine coupling systems makes even the replacement solution relatively labor intensive and time consuming. This is particularly true because spider wheel replacement typically extends the molding cycle period.

The cycle period is extended because system hardware does not facilitate wheel replacement simultaneously with one of the previously mentioned process steps (e.g. heating, rotating, cooling). Generally, mold systems do not facilitate wheel replacement while mold cavities are formed. Instead, replacement is only possible when spider wheels are decoupled from the multi-articulate machine. During a process cycle, except for at the beginning of the cycle when particulate material is placed inside a mold half and at the end of the cycle when a product is removed from a mold, the mold halves must be secured together. Particulate provision and product removal require minimal time and, in any event, require much less time than is needed to decouple spider wheels from a multi-articulate machine and recouple different wheels to the machine to accomplish replacement. Thus, mold replacement necessarily extends a molding process cycle and reduces process efficiency.

To replace a subset of molds on a wheel system the only solution is refabrication which, as indicated above, is time consuming and labor intensive and therefore expensive.

There is, therefore, a need for a mold system which facilitates easy replacement of a mold in a spider wheel system. It would be particularly advantageous if molds could be replaced without separating mold halves and while the spider wheels are secured to an associated multi-articulate machine so that a mold could be removed from the wheels and replaced during a molding process cooling step thereby limiting the time between molding processes.

BRIEF SUMMARY OF THE INVENTION

The present invention provides a mold apparatus for facilitating replacement of rotatable molds comprising first and second frames, wherein the first and second frames include first and second retainers, respectively. The apparatus also includes first and second mold portions which are positionable with respect to each other such that they form a mold, the first and second mold portions including first and second couplers, respectively, which are configured so as to be securely coupled to the first and second retainers, respectively, and a locking member linkable to the frames for securing the frames together so that the frames define a cell.

When the frames are secured together the mold is securable within the cell by securing the couplers to the retainers and the mold is removable from the cell by decoupling the couplers from the retainers. When the frames are not secured together and the couplers are coupled to the retainers, the frames are separable and when separated, the mold portions are in turn separated.

When the frames are secured together, the frames form a plurality of cells, the first and second frames include respective first and second retainers associated with each cell, and the mold includes a plurality of molds (e.g. a separate mold securable within each cell).

Preferably, the cells are arranged radially about an axis and to remove a mold, after decoupling the couplers associated with the mold to be removed from the retainers, the mold is axially lifted from an associated cell. In an alternative embodiment, a mold may be removed, after decoupling the couplers associated with the mold to be removed from the retainers, by radially sliding the mold from an associated cell.

The invention also includes a method for exchanging rotatable molds in a mold apparatus having an upper frame and a lower frame forming a plurality of cells, each retaining one of the rotatable molds, comprising the steps of detaching all connections between one of the rotatable molds and the frames, and removing the detached rotatable mold from the mold apparatus while maintaining the frames in a closed position. In one embodiment the detached mold is removed radially along a plurality of track and rail assemblies coupled to the frames. In an alternative embodiment, where the upper and lower frames are arranged about a rotation axis (i.e. the molds are radially spaced about the axis) the detached mold is axially removable. Each of the axial or radial removal methods further includes the steps of inserting a different mold into a location vacated by mold removal and connecting the different mold to the frames while maintaining frames closed.

The objects of the invention include:
(a) providing a rotatable mold apparatus and an associated method which permit independent removal of molds from, and insertion of molds into, cells defined by the apparatus without having to open the apparatus frames;
(b) providing an apparatus of the above kind which is simple and inexpensive to manufacture and use;
(c) providing an apparatus of the above kind which simplifies the process of swapping different molds within a single apparatus;
(d) providing an apparatus of the above kind which facilitates the use of molds having many different cavity characteristics; and
(e) providing a mold apparatus which facilitates mold replacement simultaneously with another molding process cycle step (e.g. cooling) so that mold replacement does not extend a cycle period.

These and other objects, advantages and aspects of the invention will become apparent from the following description. In the description, reference is made to the accompanying drawings which form a part hereof, and in which there are shown preferred embodiments of the invention. Such embodiments do not necessarily represent the full scope of the invention and reference is made therefor, to the claims herein for interpreting the scope of the invention.

BRIEF DESCRIPTION OF THE SEVERAL VIEWS OF THE DRAWINGS

FIG. 4 is a cross-sectional view taken along line 4—4 of FIG. 3 depicting removal of a mold from a cell;

DETAILED DESCRIPTION OF THE INVENTION

Generally, the inventive apparatus includes an upper frame aligned with a lower frame which together define a plurality of cells, each for receiving and containing a separate removable mold. One of the significant advantages provided by the present invention is the ability to remove one or more molds from a mold apparatus without having to separate apparatus frames or remove the spider wheel from an associated multi-articulate machine. In addition, the present invention facilitates installation of one or more molds into the apparatus without having to open apparatus frames or removing the spider wheel from the machine. The invention includes embodiments which facilitate both radial and axial mold exchange. FIGS. 1 through 6 pertain to the first embodiment which facilitates radial mold exchange while FIGS. 7 through 12 pertain to the second embodiment which facilitates axial mold exchange.

1. Radial Embodiment

Figure 1:
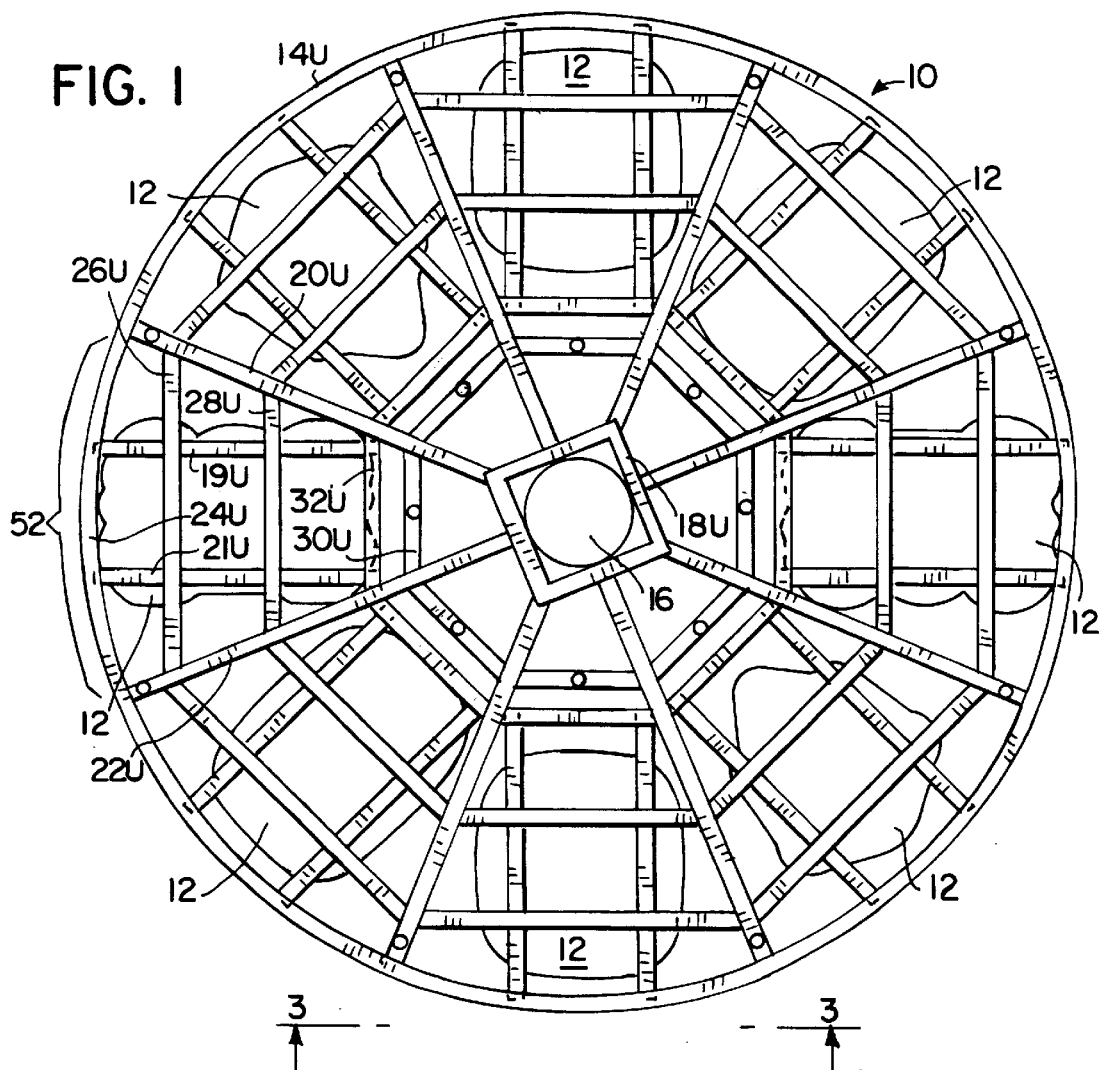
FIG. 1 is a top plan view of a first embodiment of the inventive mold apparatus.
Figure 2:
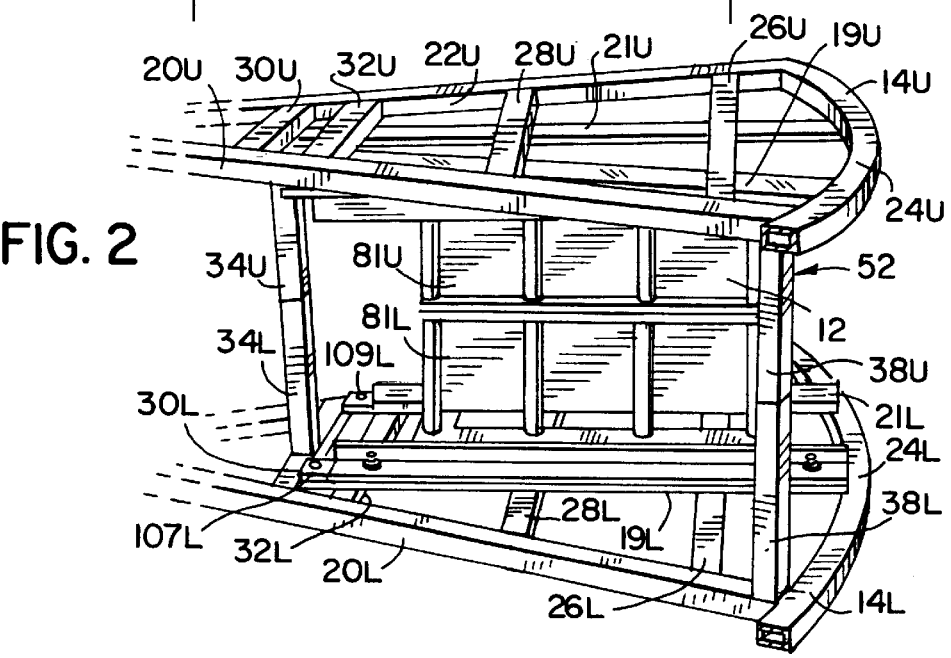
FIG. 2 is a side perspective view of a cell of the mold apparatus in FIG. 1.
Figure 3:
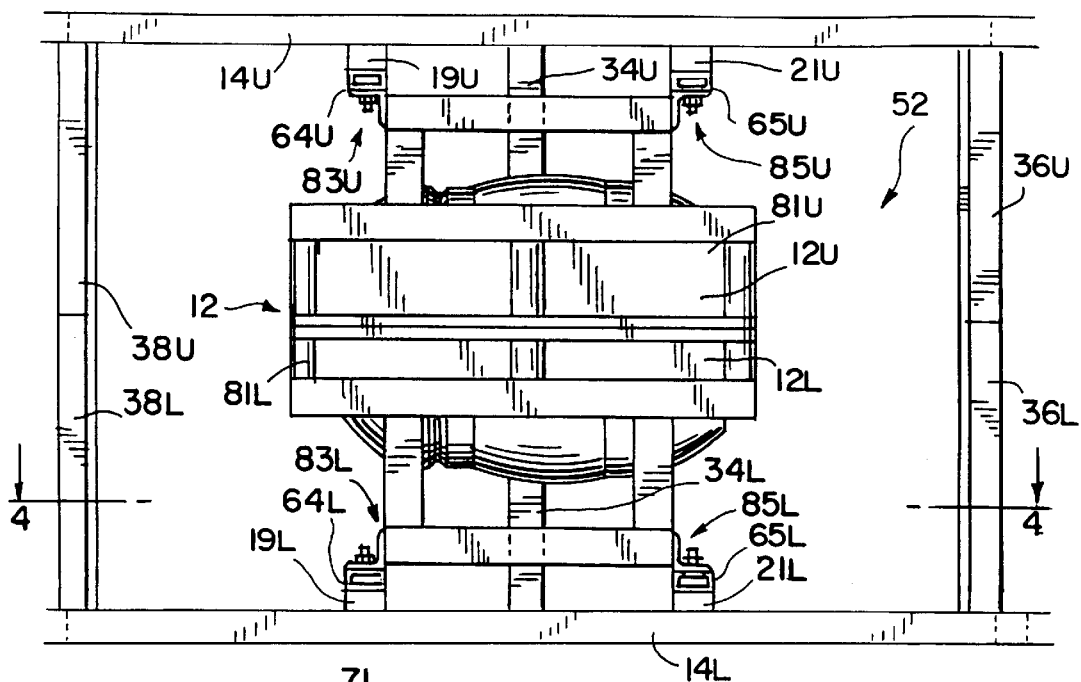
FIG. 3 is a side elevational view taken along line 3—3 of FIG. 1.

Referring now to the drawings, wherein like reference characters represent corresponding elements throughout the several views, and more specifically referring to FIGS. 1, 2 and 3 the inventive apparatus 10 which facilitates radial mold exchange includes an upper frame assembly 14U, a lower frame assembly 14L and a plurality of molds collectively referred to by numeral 12. Generally, each of frames 14U and 14L are essentially identical and therefore, unless indicated otherwise, only frame 14U will be described here in detail. Frame 14U components are identified by a number followed by "U" while similar lower frame 14L components are identified by an identical number followed by an "L".

Frame 14U includes a central coupling structure 18U, a distal annular frame member 24U and a plurality of radially extending equispaced "spoke" members (two of which are identified as 20U and 22U) which traverse the distance between structure 18U and frame member 24U. In addition, proximate structure 18U, frame 14U includes separate members which traverse the distance between adjacent spoke members (e.g. 20U and 22U), one of which is identified by numeral 30U. Similarly, other support members 32U, 28U and 26U traverse the distance between each two adjacent spoke members (e.g. 20U and 22U) at different radial distances from structure 18U.

Frame 14U further includes two track supporting members 19U and 21U positioned between each two adjacent spoke members 20U, 22U. Each support member 19U, 21U is preferably welded to members 32U, 28U and 26U so that adjacent members 19U and 21U are parallel, a proximate end is adjacent member 30U and a distal end is adjacent member 24U.

Referring to FIG. 2, frame 14U further includes three spacing/clamping members 34U, 38U (only two illustrated, in FIG. 1, location of a third is illustrated at numeral 36U) for each two adjacent spoke members 20U and 22U. Each spacing member is rigidly linked at a proximal end to another frame member and extends perpendicular thereto. Member 34U is centrally linked to member 30U while members 36U and 38U are secured to spoke members 22U and 20U, respectively, adjacent annular member 24U. As illustrated in FIG. 2, members 34U, 36U and 38U mate and can be clamped to similar members which extend from frame 14L.

Members 34U, 36U, and 38U may comprise a plurality of different configurations and perform two different functions. First, members 34U, 36U and 38U cooperate with members 34L, 36L and 38L to separate upper frame members (e.g. spokes 20U, 22U) from lower frame members (e.g. spokes 20L, 22L). Second, although not illustrated in detail with respect to this first embodiment, distal ends of members 34U, 36U and 38U are configured so that they securely and in a locking fashion receive adjacent distal ends of members 34L, 36L and 38L, respectively. To this end, distal ends of members 34U, 36U and 38U may each include a clamp or hook device to secure and lock to adjacent members 34L, 36L and 38L. Alternatively, a subset of members 34U, 36U and 38U may include a locking mechanism. Any type of locking mechanism should suffice which when locked, will maintain frames 14U and 14L together. For example, the locking member or mechanism may be as simple as a female/male mating arrangement with one or more bolts which extend through mating ends of adjacent members (e.g. through members 34U and 34L).

Although not illustrated, some other type of structure (e.g. hydraulically or pneumatically operated arms) is mechanically linked to each of upper and lower frames 14U and 14L, respectively, for, when members 34U, 36U and 38U are not locked to members 34L, 36L and 38L, lifting upper frame 14U from lower frame 14L.

Referring still to FIGS. 1, 2 and 3, frames 14U and 14L together define a separate mold receiving cell 52 between each two adjacent spoke members (e.g. 20U and 22U) when frames 14U and 14L are clamped together in a closed configuration. Generally, a cell 52 is defined by the space bound by four spoke members 20U, 22U, 20L and 22L, associated members 30U and 30L and associated members 24U and 24L. Referring also to FIG. 4, when frames 14U and 14L are clamped together, all four track supporting member 19U, 21 U, 19L and 21 L are parallel and extend radially outward.

Figure 5:
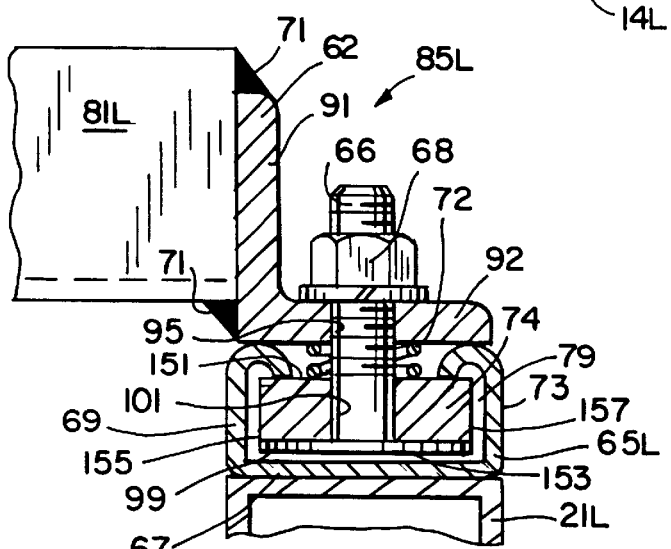
FIG. 5 is a cross-sectional view taken along line 5—5 of FIG. 4.
Figure 6:
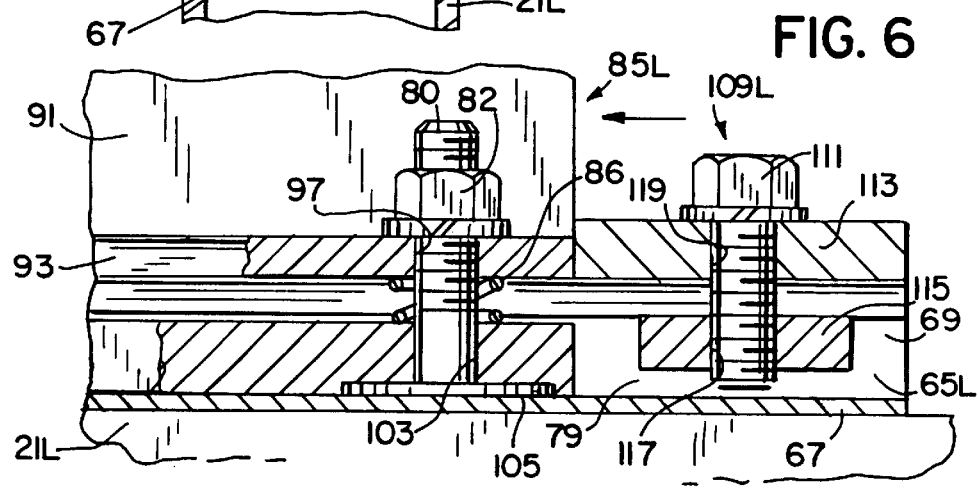
FIG. 6 is a cross-sectional view taken along line 6—6 of FIG. 4.

Referring also to FIGS. 4, 5 and 6, a separate retainer or track 64U, 64L, 65U and 65L is secured (e.g. welded or screwed onto) to each of track supporting members 19U, 19L, 21 U and 21 L, respectively, so that four tracks are positioned within each cell 52. Tracks 64U and 65U form a first retainer while tracks 64L and 65L form a second retainer.

Each of tracks 64U, 65U, 64L and 65L has identical characteristics and therefore, to simplify this explanation, only track 65L will be described in detail. Referring to FIG. 5, track 65L includes a flat bottom longitudinal member 67 and two lateral members 69 and 73 which extend in the same direction and perpendicular to member 67. Distal ends of members 69 and 73 curve inwardly toward each other so that track 65L generally forms a "C" shaped channel 79 which is restricted at the distal ends of members 69 and 73.

Referring to FIGS. 1, 2, 3 and 4, each mold 12 generally includes two mold portions or assemblies, an upper assembly 12U and a lower assembly 12L. Each of assemblies 12U and 12L are essentially identical and therefore, to simplify this explanation, only assembly 12L is explained in detail.

Assembly 12L includes a mold half 81L and two couplers in the form of rail assemblies 83L and 85L. Couplers 83L and 85L are configured so as to be coupled to retainers 64L and 65L, respectively, such that when coupled, the relative positions of mold portion 81L and frame member 14L are invariably locked. Couplers 83U and 85U serve a similar purpose in coupling the invariable positions of mold portion 81U and frame 14U. Molds formed of halves like half 81L are well known in the art and therefore are not explained here in detail, suffice it to say that when halves 81 L and 81 U are brought together (see FIG. 3) the halves 81U and 81L form a cavity into which meltable plastic particulate can be deposited for melting and forming a molded item.

Assemblies 83L and 85L (and for that matter 83U and 85U) have similar constructions and therefore, to simplify this explanation, only assembly 85L is explained here in detail. Referring specifically to FIGS. 2, 5 and 6, assembly 85L includes an "L" shaped elongate member 62, first and second bolts 66, 80, first and second nuts 68, 82, first and second springs 72, 86 and a coupler member or rail 74. L shaped member 62 is sized to extend the length of track 65L (see FIG. 2) and includes two members 91 and 93 which together form a 90° angle. Member 93 forms first and second apertures 95 and 97, respectively, at opposite ends of its length.

Rail 74 is essentially the same length as track 65L and has a width which is less than the distance between members 69 and 73 but greater than the distance between the restricted distal ends of members 69 and 73. Rail 74 thickness is less than the distance between the restricted ends of members 69 and 73 and member 67. Rail 74 forms first and second apertures 101 and 103 which are aligned with apertures 95 and 97 when assembly 85L is constructed. Rail 74 also forms longitudinal surfaces 151 and 153 and lateral rail surfaces 155 and 157.

Bolt 66 includes a wide head member 99 and a threaded distal end. Similarly, bolt 80 includes a wide head member 105 and a threaded distal end. To attach rail 74 to member 93, the threaded ends of bolts 66 and 80 are placed through apertures 101 and 103, through springs 72 and 86 and then through apertures 95 and 97. Nuts 68 and 82 are then secured to the distal ends of bolts 66 and 80, respectively.

Referring still to FIG. 5, member 91 is secured to mold half 81L in any manner known in the art. As illustrated, a preferred method is to weld member 91 to half 81 L at two locations collectively identified by number 71.

Referring now to FIGS. 2 and 6, stop assemblies (only two 107L and 109L illustrated) are provided at the proximate ends of each track 64U, 64L, 65U and 65L. The stop assemblies are of similar construction and therefore only assembly 109L is explained here in detail. Assembly 109L includes a bolt 111, a square stop member 113 and an anchor member 115. Stop member 113 is approximately the width of track 65L and has a similar length dimension. Anchor member 115 is approximately the same width and thickness as rail 74 so that member 115 fits within channel 79. Member 115 forms an aperture 117 as does stop member 113 (i.e. aperture 119). Aperture 117 is threaded so as to securely receive the threaded end of bolt 111.

To secure assembly 109L to the proximate end of track 65L, anchor member 115 is placed within channel 79 at the proximal end of track 65L, apertures 117 and 119 are aligned, bolt 111 is placed through aperture 119 and is received in aperture 117. Bolt 111 is tightened until the distal restricted ends of members 69 and 73 are clamped between anchor member 115 and stop member 113.

Referring now to FIGS. 2 through 6, assuming initially that the upper and lower frames 14U and 14L, respectively are clamped together, and that a mold 12 is outside cavity 52 (i.e. disattached from the frames), nuts 68 and 82 are loosened on each attachment assembly so that the distance between each rail 74 and a facing surface of an associated member 93 is greater than the thickness of the distal restricted ends of track members 69 and 73. Then, as best seen in FIGS. 3 and 4, to position mold 12 within cavity 52, rails 74 are aligned with adjacent track cavities 73 (see also FIG. 5) and mold 12 is forced radially inward toward structure 18U (see FIG. 1). Eventually the distal ends of rails 74 contact stop members 113 and further inward motion is impeded. At this point, the mold 12 is in the position illustrated in FIG. 2. Rail 74 lateral surfaces 155 and 157 and track 64U, 64L, 65U and 65L lateral members 69 and 73 (see FIG. 5) impede lateral motion while rail 74 longitudinal surfaces 151 and 153 and track longitudinal member 67 impede longitudinal motion of mold 12. To impede radial movement of mold 12, nuts 68 and 82 are tightened so that the restricted ends of members 69 and 73 are clamped between rail 74 and a facing surface of an adjacent member 93. Once mold 12 is secured in this fashion, radial mold motion is impeded.

To remove mold 12 from cavity 52, the above process is reversed. To this end, bolts 68 and 82 are loosened and mold 12 is slid radially out of cavity 52 along tracks 64U, 64L, 65U and 65L.

Referring to FIGS. 1, 2 and 3, when molds 12 are secured (i.e. nuts 68 and 82 are tightened) in their respective cavities 52, by decoupling all claiming members 34U from 34L, 36U from 36L and 38U from 38L, upper frame 14U can be decoupled from lower frame 14L. In this case, assuming mold halves 81U and 81L are not independently coupled together, frames 14U and 14L can be separated, thereby separating all upper mold halves 81U from adjacent lower mold halves 81L.

Thus, it should be appreciated that this inventive first system facilitates normal rotational molding procedures whereby a plurality of molds 12 can be simultaneously opened and closed to facilitate rapid deposit of mold particulate material and rapid removal of manufactured products after melting, rotation and hardening. In addition, the inventive apparatus advantageously facilitates removal of any number of the molds 12 separately from frames 14U and 14L by detaching rails 74 from adjacent tracks and radial removal of the associated mold 12. Thus, as illustrated in FIG. 1, many different mold forms can be used with and swapped in and out of a single frame apparatus even while frames 14U and 14L are secured (e.g. while manufactured parts are cooling) thereby saving time.

II. Axial Embodiment

The second embodiment is similar to the first embodiment described above in that it includes upper and lower frames 114U and 114L, respectively, which can be either locked together to form mold receiving cells, or can be unlocked and separated so that a plurality of mold halves which are coupled to frames 114U and 114L can be separated for insertion of particulate molding material or removal of molded products. In addition, even while frames 114U and 114L are locked together, one or more molds linked thereto can be delinked and removed from the frames and, if desired, can be replaced. What is different between the second and first embodiments is that, instead of facilitating radial mold removal as in the first embodiment, with the second embodiment molds are removed axially.

Figure 7:
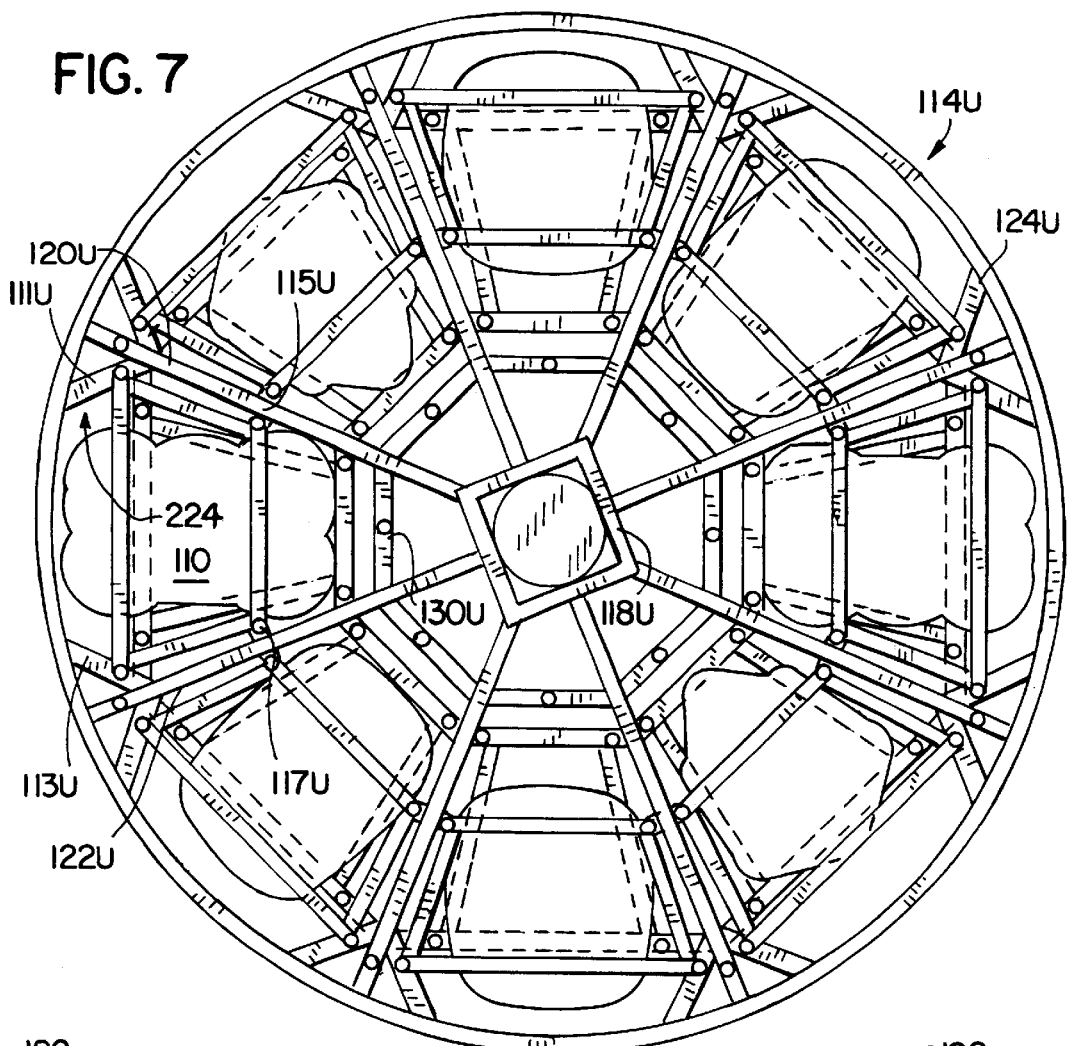
FIG. 7 is a top plan view of a second embodiment of the inventive mold apparatus.
Figure 8:
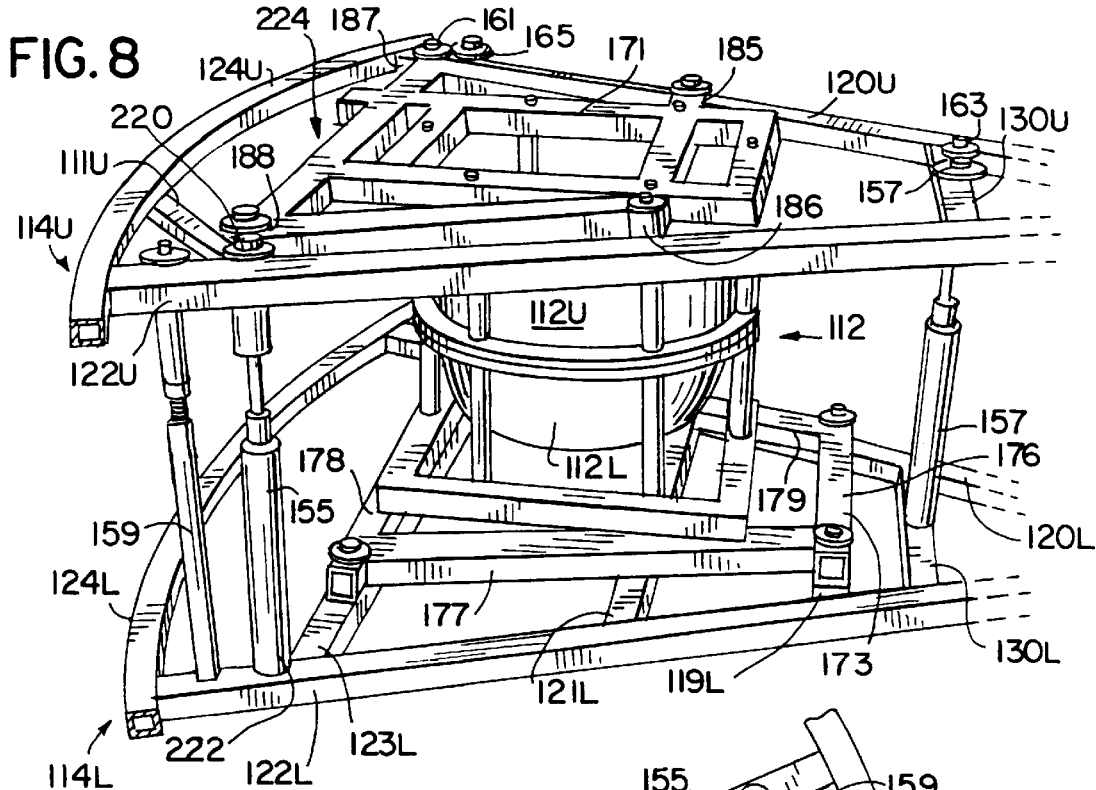
FIG. 8 is a side perspective view of a cell of the mold apparatus in FIG. 7.
Figure 9:
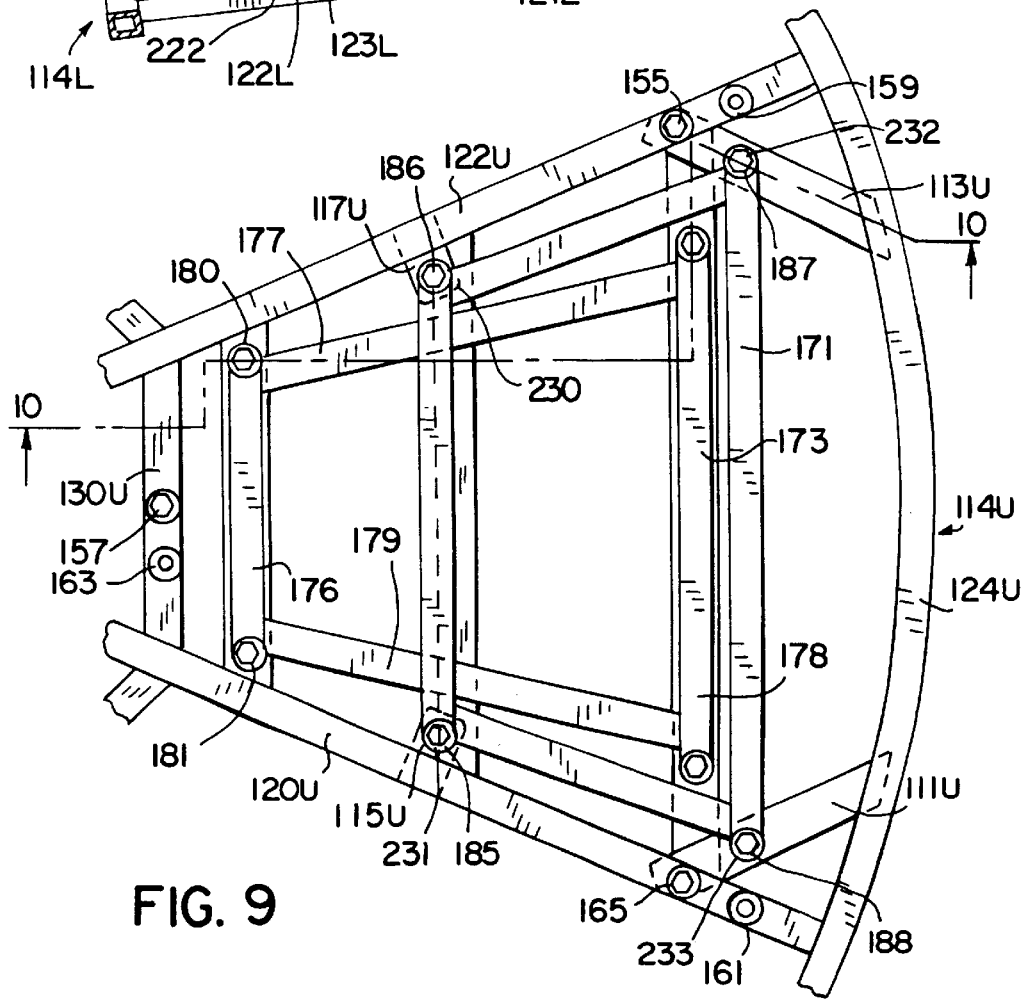
FIG. 9 is a top plan view of the upper frame of the mold apparatus in FIG. 7.

Referring to FIGS. 7 through 9, each of frames 114U and 114L are very similar. To the extend that frames 114U and 114L are similar, only frame 114U will be explained in detail and differences will be identified throughout. Upper frame 114U includes a central coupling structure 118, a distal annular frame member 124U and a plurality of radially extending equispaced spoke members (two of which are identified as 120U and 122U) which traverse the distance between structure 118U and member 124U. Frame 114U also includes brace members (one identified as 130U) between adjacent spoke members and proximate structure 118U.

Figure 10:
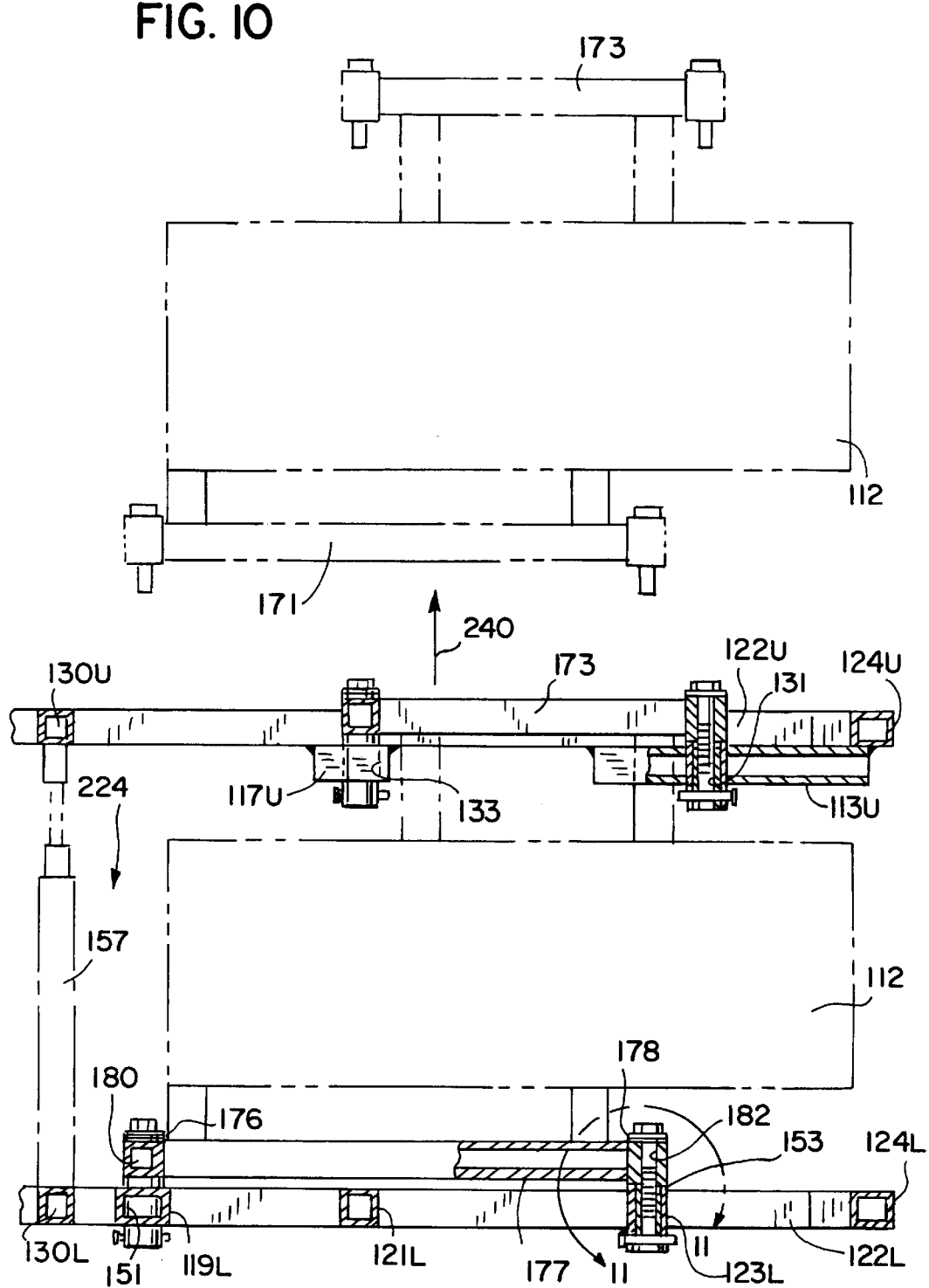
FIG. 10 is a cross-sectional view taken along line 10—10 of FIG. 9.

Unique to frame 114U, and not included on frame 114L, frame 114U forms two angle members, exemplary angle members are identified by numerals 111U and 113U, each member 111U and 113U extending from annular member 124U to proximate end of one of members 120U and 122U, respectively. Also unique to frame 114U, frame 114U forms two extension members 115U and 117U between each two spoke members. Referring also to FIG. 10, each of members 111U, 113U, 115U and 117U forms an aperture, the aperture in member 113U identified by numeral 131 and the aperture in member 117U identified by numeral 113.

Referring to FIG. 8, lower frame 114L also has some unique structure including three additional support members 119L, 121L and 123L between each two adjacent spoke members 119L, 121L and 123L spaced apart between member 130L and member 124L, each traversing the distance between adjacent spoke members. Two apertures are formed in opposite ends of each of members 119L and 123L, one aperture 151 in member 119L and one aperture 153 in member 123L illustrated (see FIG. 10).

Referring to FIGS. 8 and 10, three separating assemblies are associated with each adjacent pair of spoke members and are positioned between frames 114U and 114L. In FIG. 8, only one stop assembly 159 is illustrated, view of the second and third assemblies blocked. Each assembly 159 includes a rigid stop and an adjustable stop linked at separate ends to frames 114U and 114L. The location of the other two stop assemblies associated with spoke members 120U and 122U are identified by ends 161 and 163 in FIG. 9.

In addition, referring still to FIG. 8, a plurality of locking assemblies are also linked between frames 14U and 14L, a separate locking assembly located adjacent each separate assembly. Two locking assemblies 155 and 157 are illustrated, however, the location of the other locking assemblies associated with adjacent spoke members 122U and 12U is identified by end 165 in FIG. 9. When frames 114U and 114L are brought together locking assemblies 155,157 and 165 can be used to lock the frames 114U and 114L together. While any locking assembly would suffice, a preferred assembly includes a bolt which extends though an upper frame member and is secured in a bolt receiving member which is securely attached to a similarly positioned and opposing lower frame member. For example, in FIG. 8, assembly 155 generally includes a bolt 220 which extends through member 122U and is threadably secured within a receiving member 222 which is in turn secured to member 122L. To lock frames 114U and 114L together, bolts 220 are tightened until the stops 159 make contact.

Referring to FIGS. 7, 8 and 10, when frames 114U and 114L are locked together, mold receiving cells are formed between each proximate four spoke members 120U, 120L, 122U and 122L, associated members 130U and 130L and associated members 124U and 124L, one cell identified by number 224.

Referring to FIGS. 7, 8 and 9, according to the second inventive embodiment, each mold 112 includes two separate mold assemblies 112U and 112L. Each assembly 112U and 112L includes a mold half similar to the mold halves described above with respect to the first embodiment, and a coupler assembly secured to each mold half. The coupler assembly secured to the upper mold half is identified as 171 while the coupler assembly secured to the lower mold half is identified as 173.

Assembly 173 includes four member 176,177,178 and 179 which form a trapezoid wherein opposite members 176 and 178 are parallel and spaced apart a distance equal to the distance between members 123L and 119L and where the distance between opposing members 177 and 179 is such that coupler assembly 173 can fit between adjacent spokes 120U and 122U and also between opposing members 115U and 117U when axially passed therethrough. The lower mold half is secured to assembly 173.

Importantly when assembly 173 is formed with the dimensions indicated, assembly 173 can fit between members 120U, 122U, 130U and 124U but will be stopped when members 176 and 178 contact members 119L and 122L, respectively. Two linking assemblies 180,181 are provided at the ends of member 176 which, when member 176 is adjacent member 119L, align with the apertures in member 119L. Similarly, two linking assemblies 182 and 183 are provided in member 178 which, when member 178 is adjacent member 123L, align with the apertures in member 123L.

Referring still to FIG. 8, coupler assembly 171 includes a lattice of members which is secured to the upper mold half. While a specific lattice design is illustrated, the important aspect of assembly 117 is that distal ends of some members extend outwardly such that the ends contact members 111U, 113U, 115U and 117U. Said distal ends are identified by numerals 230, 231, 232 and 233. A linking assembly 185, 186,187, and 188 is provided at each of distal ends 231, 230, 232 and 233, respectively, which aligns with an aperture in a member 115U, 117U, 113U and 111U, respectively.

Thus, for each mold 112 there are eight aperture/linking assembly pairs, four pairs associated with each coupler assembly 171 and 173. First, second, third and fourth pairs comprise linking assemblies associated with assembly 173 and apertures associated with members 111U, 113U, 115U and 117U, respectively. The fifth and sixth pairs are associated with members 176 and 119L and the seventh and eighth pairs are associated with members 178 and 123L. As all linking assemblies are essentially of the same construction, only one assembly 182 will be explained here to simplify this explanation.

Figure 11:
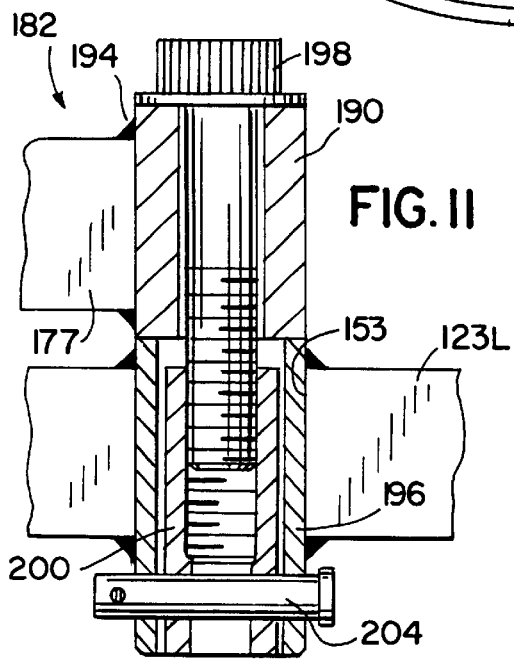
FIG. 11 is a cross-sectional view of an engaged fastener as in FIG. 10.
Figure 12:
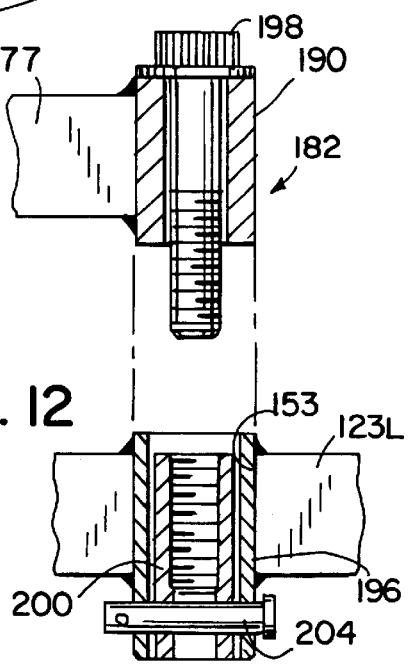
FIG. 12 is a cross-sectional view of the fastener in FIG. 11, albeit disengaged.

Referring to FIGS. 11 and 12, a pair of cross-sectional views show linking assembly 182 in engaged and disengaged positions, respectively. Referring to FIG. 11, assembly 182 includes upper tubular member 190 connected to member 177 at spot weld 194. Another tubular member 196 is welded within aperture 153 of member 123L. A socket head cap screw 198 and receiver 200 are connected within the tubular cavity formed between members 190 and 196. Specifically, socket head cap screw 198 is threadably engageable with the internal threads of receiver 200. A washer 202 is provided between the head of the socket head cap screw 198 and member 190. A clevis pin 204 is inserted through apertures in tubular member 196 and receiver 200, thereby retaining receiver 200 within tubular member 196. Use of receiver 200 is particularly beneficial as receivers 200 with stripped threads can be easily replaced.

In operation, referring to FIGS. 7 through 12, assuming frames 114U and 114L are locked together and at least one mold 112 is secured within a mold cell 224, to remove the mold 112 without separating frames 114U and 114L, each socket head cap screw 198 associated with each linking assembly is loosened. Then, mold 112 is pulled axially from an associated cell along the direction indicated by arrow 240 (see FIG. 10). Thereafter mold 112 can be opened separately of frames 114U and 114L.

To replace a mold within a cell, the mold is simply dropped down into the cell (i.e. in the direction opposite arrow 240 until members 176 and 178 contact members 119L and 123L, respectively, and distal ends 231, 230, 232 and 233 contact members 115U, 117U, 113U and 111U. At this point all linking assemblies should be aligned with associated apertures. Then socket head cap screws 198 are secured within adjacent retainers 200.

As with the first embodiment, when mold halves 112U and 112L are secured to frames 114U and 114L, respectively, locking assemblies (see 155, 157 in FIG. 8) can be unlocked and an overhead hoist (not illustrated) can be used to separate all molds at once.

It should be understood that the methods and apparatuses described above are only exemplary and do not limit the scope of the invention, and that various modifications could be made by those skilled in the art that would fall under the scope of the invention. For example, while various preferred locking and linking assemblies have been described above, clearly any types of such assemblies which can maintain respective components secured together during a molding process cycle are contemplated. In addition, other frame designs are contemplated, the important aspect of the invention being that separate molds can be individually removed from linked frames without having to open all mold halves or remove the spider wheel from the machine and during a typical process cycle step so that the cycle period is not substantially extended to facilitate replacement.

To apprise the public of the scope of this invention, we make the following claims:

We claim:

1. A mold apparatus for facilitating replacement of rotatable molds, the apparatus comprising:

first and second frames, the first and second frames including first and second retainers, respectively;

first and second mold portions which are positionable with respect to each other such that they form a mold, the first and second mold portions including first and second couplers, respectively, which are configured so as to be securely coupled to the first and second retainers, respectively, such that the relative positions of the first mold portion to the first frame and the second mold portion to the second frame are invariable; and a locking member linkable to the frames for securing the frames together so that the frames define a cell;

wherein, when the frames are secured together the mold is securable within the cell by securing the couplers to the retainers and the mold is removable from the cell by decoupling the couplers from the retainers, and when the frames are not secured together and the couplers are coupled to the retainers, the mold portions are separable by separating the frames; and wherein the cells are arranged radially about an axis and to remove a mold, after decoupling the couplers attached to the mold to be removed from the retainers, the mold is axially lifted from an associated cell.

2. The apparatus of claim 1 wherein, when the frames are secured together the frames form a plurality of cells, each cell includes a first retainer linked to the first frame and a second retainer linked to the second frame and the mold includes a plurality of molds, a separate mold securable within each cell.

3. The apparatus of claim 1 wherein each frame includes a plurality of rigid members which form a plurality of retaining apertures, each of the first and second retainers includes a plurality of bolts, each of the first and second couplers includes a plurality of coupler members secured to the first and second mold portions, respectively, the coupler members forming a plurality of coupler apertures and, wherein, to couple the mold portions to the frames, the coupler and retaining apertures are aligned and the bolts secured therethrough.

4. The apparatus of claim 1 wherein each frame includes a plurality of rigid members which form a plurality of retaining apertures, each of the first and second retainers includes a plurality of bolts, each of the first and second couplers includes a plurality of coupler members secured to the first and second mold portions, respectively, the coupler members forming a plurality of coupler apertures and, wherein, to couple the mold portions to the frames, the coupler and retaining apertures are aligned and the bolts secured therethrough.

5. The apparatus of claim 1 wherein each frame includes a plurality of rigid members, the apparatus further including first and second tracks which are secured to the first and second frames, respectively, and are parallel when the frames are clamped together, the apparatus also including first and second rails which are secured to the first and second mold portions, respectively, are parallel when the mold is formed and are receivable by the first and second tracks for guiding the mold into and out of the cell.

6. The apparatus of claim 5 wherein each track has a "C" shaped cross section which forms a channel which runs essentially the length of the track and each rail has an "I" shaped cross section and each rail fits within a channel to limit lateral and longitudinal rail motion.

7. The apparatus of claim 6 wherein each track includes two parallel tracks and each rail includes two parallel rails.

8. A method for exchanging rotatable molds in a mold apparatus having an upper frame and a lower frame forming a plurality of cells, each cell retaining one of the molds, the cells arranged radially about an axis, the method comprising the steps of:

detaching all connections between one of the molds and the frames; and removing the disconnected mold from the mold apparatus while maintaining the frames in a closed position, wherein, said disconnected mold is removed axially from an associated cell.

9. A mold apparatus for facilitating replacement of rotatable molds, the apparatus comprising:

first and second frames, the first and second frames including first and second retainers and a plurality of rigid members, respectively;

first and second tracks which are secured to the first and second frames, respectively, and are parallel when the frames are clamped together;

first and second mold portions which are positionable with respect to each other such that they form a mold, the first and second mold portions including first and second couplers, respectively, which are configured so as to be securely coupled to the first and second retainers, respectively, such that the relative positions of the first mold portion to the first frame and the second mold portion to the second frame are invariable;

first and second rails which are secured to the first and second mold portions, respectively, are parallel when the mold is formed and are receivable by the first and second tracks for guiding the mold into and out of the cell; and a locking member linkable to the frames for securing the frames together so that the frames define a cell;

wherein, when the frames are secured together the mold is securable within the cell by securing the couplers to the retainers and the mold is removable from the cell by decoupling the couplers from the retainers, and when the frames are not secured together and the couplers are coupled to the retainers, the mold portions are separable by separating the frames.

10. The apparatus of claim 9 wherein each track has a "C" shaped cross section which forms a channel which runs essentially the length of the track and each rail has an "I" shaped cross section and each rail fits within a channel to limit lateral and longitudinal rail motion.

11. The apparatus of claim 10 wherein each track includes two parallel tracks and each rail includes two parallel rails.

12. The apparatus of claim 9 wherein, when the frames are secured together the frames form a plurality of cells, each cell includes a first retainer linked to the first frame and a second retainer linked to the second frame and the mold includes a plurality of molds, a separate mold securable within each cell.

13. The apparatus of claim 9 wherein the cells are arranged radially about an axis and to remove a mold, after decoupling the couplers attached to the mold to be removed from the retainers, the mold is radially slid from the cell.

14. The apparatus of claim 1 wherein each frame includes a plurality of rigid members which form a plurality of retaining apertures, each of the first and second retainers includes a plurality of bolts, each of the first and second couplers includes a plurality of coupler members secured to the first and second mold portions, respectively, the coupler members forming a plurality of coupler apertures and, wherein, to couple the mold portions to the frames, the coupler and retaining apertures are aligned and the bolts secured therethrough.

* * * * *